(12) United States Patent
Becker et al.

(10) Patent No.: US 8,109,574 B2
(45) Date of Patent: Feb. 7, 2012

(54) ADJUSTABLE HINGE MOUNTINGS FOR A MOTOR VEHICLE SEAT

(75) Inventors: Burckhard Becker, Solingen (DE); Stefan Pietas, Solingen (DE); Robert Houston, Leichlingen (DE); Jozef Potecin, Solingen (DE)

(73) Assignee: C. Rob. Hammerstein GmbH & Co., KG (DE)

( * ) Notice: Subject to any disclaimer, the term of this patent is extended or adjusted under 35 U.S.C. 154(b) by 505 days.

(21) Appl. No.: 12/257,138

(22) Filed: Oct. 23, 2008

(65) Prior Publication Data
US 2009/0108656 A1    Apr. 30, 2009

(30) Foreign Application Priority Data
Oct. 24, 2007  (DE) .......................... 10 2007 051 130

(51) Int. Cl.
*B60N 2/02* (2006.01)
(52) U.S. Cl. ............. 297/378.14; 297/367 R; 297/378.1
(58) Field of Classification Search .............. 297/378.1, 297/378.12, 378.14, 366, 367 R
See application file for complete search history.

(56) References Cited

U.S. PATENT DOCUMENTS

| | | | | |
|---|---|---|---|---|
| 5,154,476 A * | 10/1992 | Haider et al. | ............. | 297/367 R |
| 5,211,445 A * | 5/1993 | Husted et al. | ............. | 297/378.12 |
| 5,482,349 A * | 1/1996 | Richter et al. | ................... | 297/15 |
| 5,588,705 A * | 12/1996 | Chang | ........................ | 297/367 R |
| 5,788,330 A * | 8/1998 | Ryan | ........................ | 297/378.12 |
| 6,199,953 B1 * | 3/2001 | Chen | .......................... | 297/367 R |
| 6,209,955 B1 * | 4/2001 | Seibold | ..................... | 297/216.13 |
| 6,345,867 B1 * | 2/2002 | Hellrung et al. | ............. | 297/336 |
| 6,352,310 B1 * | 3/2002 | Schmidt et al. | .......... | 297/378.12 |
| 6,502,903 B2 * | 1/2003 | Bruck et al. | ............. | 297/378.11 |
| 6,644,746 B2 * | 11/2003 | Bruck et al. | ............. | 297/378.11 |
| 6,910,739 B2 * | 6/2005 | Grable et al. | ............ | 297/378.12 |

* cited by examiner

*Primary Examiner* — David Dunn
*Assistant Examiner* — Erika Garrett
(74) *Attorney, Agent, or Firm* — Cantor Colburn LLP

(57) ABSTRACT

An adjustable hinge mountings has a first hinge arm, a second hinge arm, a toothed quadrant centered on a hinge axis and connected to the first hinge arm, a detent part which has a toothed surface feature cooperating with the toothed quadrant and a control part associated with the detent part. The hinge arms can be pivoted between an active angular range in which the detent part is allowed to engage the toothed quadrant and a passive angular range in which the detent part is not located opposite the toothed quadrant so that the detent part is not allowed to engage the toothed quadrant. In the passive angular range, the detent part is retained by the control part in a passive position in which it is not in the range of movement of the toothed quadrant. In the active angular range, the detent part adopts an active position in which the detent part can be brought into engagement with the toothed quadrant. When passing from the passive angular range to the active angular range, the toothed quadrant actuates the control part either directly or indirectly.

13 Claims, 3 Drawing Sheets

ADJUSTABLE HINGE MOUNTINGS FOR A MOTOR VEHICLE SEAT

Figure 1:
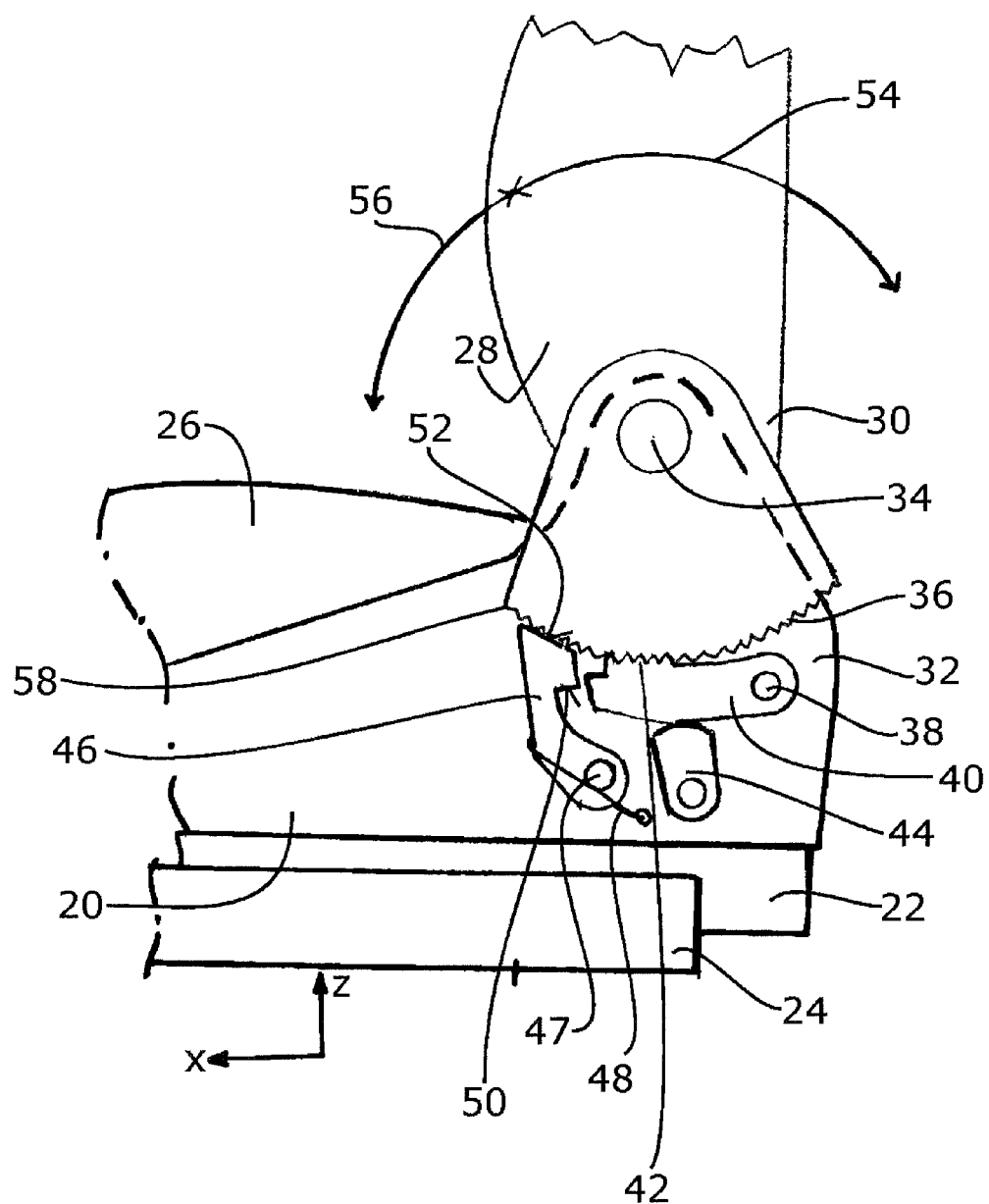

The invention relates to an improved adjustable hinge mountings for a motor vehicle seat with a first hinge arm, with a second hinge arm that is pivotal and adjustable about a hinge axis relative to said first hinge arm, with a toothed quadrant that is centered on the hinge axis and is connected to said first hinge arm, with a detent part which has a toothed surface feature cooperating with said toothed quadrant and which can be moved from a normally existing detent position into a release position, and with a control part that is associated with said detent part.

Such a hinge mountings is known from U.S. Pat. No. 4,634,182 or from U.S. Pat. No. 5,421,640 for example. Usually, the angular range over which the toothed quadrant extends is adapted to the angular range about which the second hinge arm can maximally be pivoted relative to the first hinge arm. There is however a need for a quite large pivoting angle of the two hinge arms with respect to each other, for example a pivoting angle greater than 90°. This may for example be the case if the hinge mountings is utilized as a hinge mountings for a seat back, which is anyway its preferred application. If there is provided that the seat back can be almost completely folded onto the seat part, so-called table function, and/or can be folded backward to such an extent that it lengthens the seat part toward the back, so-called reclining seat function, the pivoting angle is significantly greater than 90°. The toothed quadrant must extend over at least this angular range. With such wide angular ranges, the toothed quadrant is quite large, needs much space and has moreover a considerable weight.

Actually however it is not necessary to configure the hinge mountings to be adjustable over the entire adjustment path. Instead, it is sufficient to limit the adjustability to the usable range. This is where the invention comes in.

It is the object of the invention to further develop the adjustable hinge mountings of the type mentioned herein above in such a manner that it is of a simple construction while being adapted for large angles of adjustment, that the toothed quadrant in particular can be of reduced dimensions whilst allowing for a cooperation of toothed quadrant and detent part without mutual hindrance.

The solution to this object is achieved in view of the adjustable hinge mountings of the type mentioned herein above in that the hinge arms can be pivoted between an active angular range in which the detent part is allowed to engage the toothed quadrant and a passive angular range in which the detent part is not located opposite the toothed quadrant so that the detent part is not allowed to engage the toothed quadrant, that, in the passive angular range, the detent part is retained by the control part in a passive position in which it is outside of the addendum circle of the toothed quadrant, that, in the active angular range, the control part allows the detent part to adopt an active position in which the detent part can be brought into engagement with the toothed quadrant and that, when passing from the passive angular range to the active angular range, the toothed quadrant actuates the control part either directly or indirectly. The control part then abuts the toothed quadrant, having no influence upon the detent part as long as it abuts the toothed quadrant.

When passing from the active angular range to the passive angular range, the control part is directly or indirectly actuated by the toothed quadrant and causes the detent part to reach the passive position and to remain there. In this case, the control part does not abut the toothed quadrant. Through contact with the toothed quadrant, the control part is brought into its different positions. The control part either retains the detent part in the passive position or it has no influence upon the detent part.

On this hinge mountings, the toothed segment extends over an angular range (e.g., about 110 degrees) that is smaller than the angular range of the entire adjustment of the hinge mountings (e.g., about 90 degrees). The toothed quadrant is in particular associated with an adjustment range within which it is possible to immobilize, more specifically to immobilize in close steps, the two hinge arms. In the x direction before this useful area and/or also behind this area, it is no longer necessary to gradually immobilize the hinge arms as this is the case in the adjustment or useful area. There, the toothed quadrant needs not be formed and is not formed either. Accordingly, the range of adjustment of the hinge range is greater than the adjustment range; the difference is at least 15%, in particular at least 20%.

The invention avoids the problem according to which, assuming that the toothed quadrant is located outside of the adjustment range, the toothed quadrant will collide with the toothed surface feature of the detent part or with the detent part itself upon pivoting into the adjustment range. The invention ensures that the detent part is only capable of adopting an active position if its teeth are allowed to engage the toothed quadrant. This is the case in the active angular range. Outside of this active angular range, meaning in the passive angular range, the detent part is retained in a passive position by the control part. Then, it is located outside of the circle of movement of the toothed quadrant and cannot collide with it. Accordingly, a collision is not possible, and the toothed surface feature of the detent part and/or the teeth of the toothed quadrant cannot get damaged.

If the toothed quadrant is pivoted from the passive angular range into the active angular range, the toothed quadrant pushes to clear the way, directly or indirectly clearing the control part out of its path. As a result, the control part no longer performs its function, which consists in keeping the detent part in the passive position, and the detent part can now be brought into engagement with the toothed quadrant. The teeth are prevented from grinding onto each other or from being damaged otherwise.

In a preferred developed implementation, at least one of the following parts: control part, detent part and blocking cam is configured to be a part that is pivotal about an axis on the second hinge arm. Alternatively, it is also possible to fix at least one or all of the three parts mentioned in a pusher guide or a longitudinal guide that is formed on the second hinge arm.

In a preferred developed implementation, a blocking cam is provided on the second hinge arm. In its blocking position a clamping flank thereof abuts the detent part, pushing it with a zero clearance fit into the teeth of the toothed quadrant. The angles are chosen for self-locking to occur in the return flow path of the force and for the blocking condition of the blocking cam not to be locally fixed but to be determined respectively by the given conditions. It is configured according to prior art.

Finally, a prior art actuation mechanism for actuating the detent part between a normally occurring detent position and a release position is provided.

Figure 2:
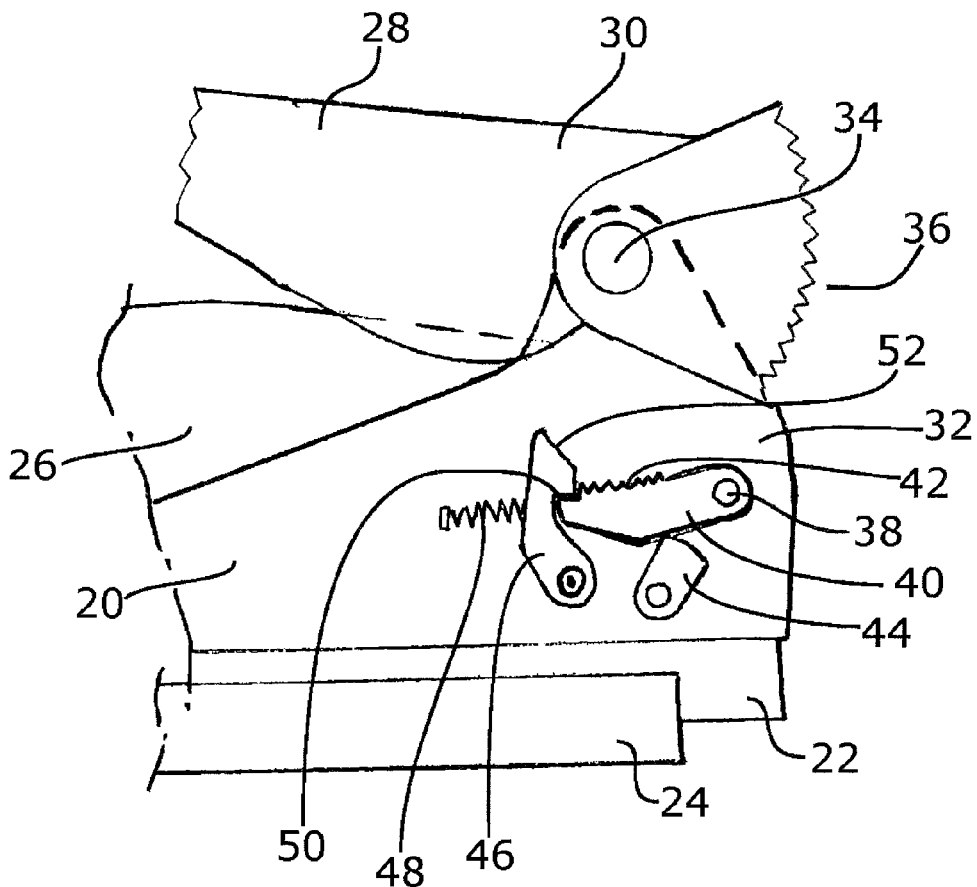
Figure 4:
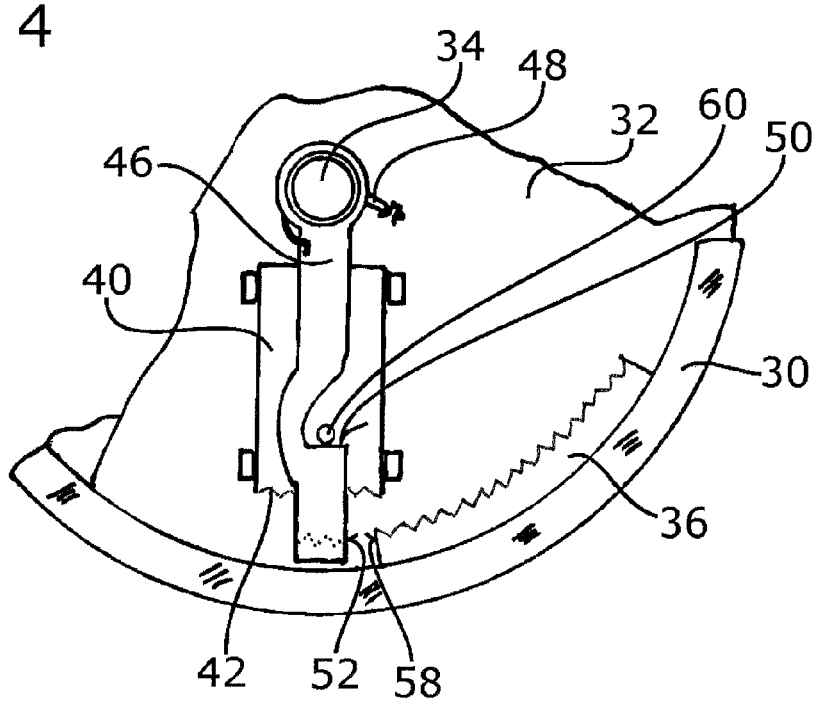
Figure 3:
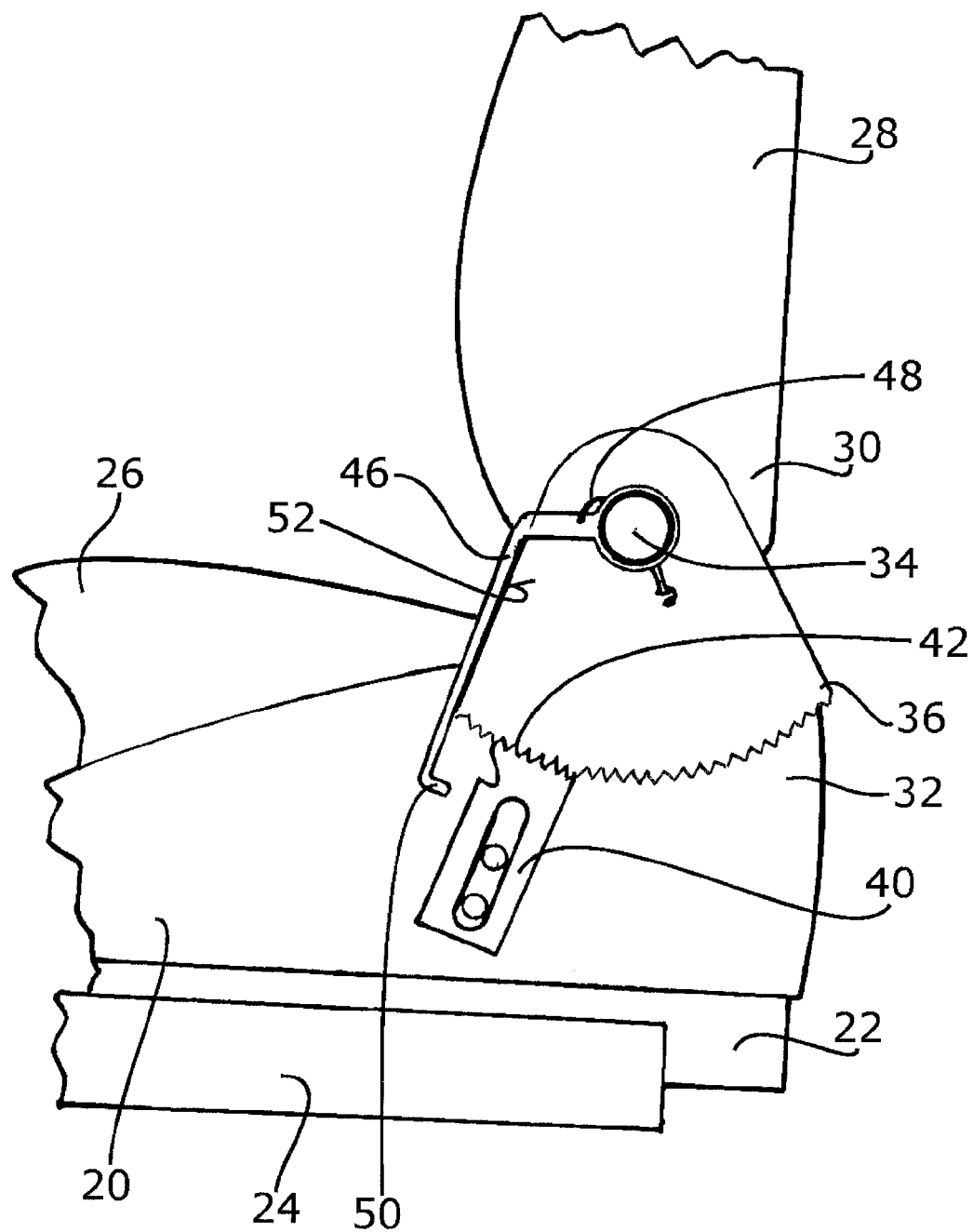

Other features and advantages will become more apparent upon reviewing the appended claims and the following non restrictive description of embodiments of the invention, given by way of example only with reference to the drawing. In said drawing:

FIG. 1: is a simplified side view of a back part of a motor vehicle seat with a hinge mountings that is configured in the form of a seat back hinge mountings, FIG. 2: is an illustration like FIG. 1, but now the seat back is almost horizontally folded forward into a table position, FIG. 3: is an illustration of a second exemplary embodiment in a view and an illustration similar to FIG. 1, and FIG. 4: shows a third exemplary embodiment in a top view.

In the first two exemplary embodiments, only a portion of a motor vehicle seat is shown, namely the rear lower area. Herein after, only the first exemplary embodiment will be discussed at first, and then, the other exemplary embodiments will only be discussed insofar as they differ from the first exemplary embodiment.

The vehicle seat shown has a seat carrier 20 that is carried by an underframe of which there is shown one pair of rails having a top rail 22 and a bottom rail 24. The latter rail 24 is connected to an underbody of a vehicle (not shown) in a known way. The seat carrier 20 carries a padding 26 that has only been outlined herein. Further, a seat back 28 is hinge-linked thereto via an adjustable hinge mountings. In its lower part, it forms a first hinge arm 30. An associated second hinge arm 32 is realized by a portion of the seat carrier. These two hinge arms 30, 32 are pivotal and adjustable relative to each other about a hinge axis 34. For this purpose, a toothed quadrant 36 is connected to the first hinge arm 30. Its position illustrates the pivoted position of the seat back 28. It protrudes approximately in a direction opposite the seat back 28. When viewed from the hinge axis 34, the toothed quadrant 36 in FIG. 1 protrudes substantially downward whilst the seat back 28 substantially extends toward the top.

A detent part 40 is articulated to the second hinge arm for pivotal movement about an axis 38 of the detent part, said detent part being configured to be a detent arm in the instant case. It has a toothed surface feature 42 that meshes with the teeth of the toothed quadrant 36 in the illustration shown in FIG. 1 and that is out of engagement in the illustration shown in FIG. 2. A blocking cam 44 is associated with the detent part 40; it is fixed to the second hinge arm 32 for pivotal movement about an axis of the cam and is configured according to prior art. It has a clamping flank which, in the blocking position as shown in FIG. 1, abuts a mating flank of the detent part with a zero clearance fit and retains said detent part in the blocked position. In the release position shown in FIG. 2, the blocking cam 44 is pivoted. In this position it also abuts the detent part 40 and prevents it from travelling downward.

Finally, there is provided a control part 46 that is articulated to the second hinge arm 32 for pivotal movement about an axis of the control part. It is elastically biased clockwise by a spring 48. The control part 46 has a retaining means 50 that is configured in the form of a retaining flank and an abutment flank 52. In the position viewed in FIG. 2, this abutment flank 52 is located in the region of the motion circle of the toothed quadrant 36. Put another way, the abutment flank 52 is located on an arc of a circle about the hinge axis 34, said arc having a radius that corresponds to the distance separating the teeth of the toothed quadrant 36 from the hinge axis 34. In the blocked position as viewed in FIG. 1, by contrast, the abutment flank 52 is outside of the motion circle of the toothed quadrant 36, as shown in FIG. 1, but abuts the toothed quadrant 36.

In an alternative that has not been illustrated herein, the toothed quadrant 36 has a concentric shoulder against which the abutment flank 52 fits instead of abutting the teeth. As a result, the abutment flank 52 is prevented from contacting teeth or rather from abutting a continuously extending arc.

In the condition shown in FIG. 1, the detent part 40 is located in an active position, the toothed surface feature 42 and the toothed quadrant 36 are facing each other so that engagement is possible any time, as is also shown, although they can also be brought out of engagement. The active position of the detent part 40 is understood to be the condition in which the detent part 40 is engaged or is ready for engagement, lying opposite the toothed quadrant 36. In the condition shown in FIG. 2, the detent part 40 is in the passive position. It cannot interact with the toothed quadrant 36. The teeth of the toothed quadrant 36 do not face the detent part 40. The detent part 40 is retained in the passive position by the control part 46. As a result, it cannot move upward, meaning clockwise.

The sequence of movements is as follows:

In the condition shown in FIG. 1, the seat back 28 and as a result thereof the hinge mountings is in an active angular range 54 that is also defined as the normal adjustment or useful range. Before and/or behind, there is a passive angular range 56. It is defined by the fact that the toothed quadrant 36 is pivoted with respect to the detent part 40 to such an extent that the detent part 40 cannot interact with the toothed quadrant 36. If in this condition, as viewed in FIG. 2, the detent part 40 were released by the control part 46 and pivoted upward, no function would be achieved. It would then lie in the pivoting path of the toothed quadrant 36 though. This condition is not wanted though and should not occur. Instead, the control part 46 only releases the detent part 40 if the hinge mountings and as a result thereof its hinge arms 30, 32 are in the active angular range 54, meaning if the toothed quadrant 36 faces the detent part 40. The release of the detent part 40, starting from the position shown in FIG. 2, occurs as follows:

When the seat back 28 is pivoted upward clockwise from the position shown in FIG. 2, a front edge 58 of the toothed quadrant 36 hits the abutment flank 52 of the control part 46. The discrete parts are associated in such a manner that in this condition, meaning in the abutment condition, the toothed quadrant 36 is already located above the detent part 40. If the seat back is pivoted further clockwise, the control part 46 is brought closer to the position shown in FIG. 1. The retaining flank which forms the retaining means 50 thereby glides from the corresponding flank of the detent part 40 so that its clockwise movement is no longer blocked. It can now engage the toothed quadrant 36, as shown in FIG. 1.

The abutment flank 52 of the control part 46 now abuts the teeth of the toothed quadrant 36, thus sensing whether this toothed quadrant 36 is located directly above the abutment flank 52 or not.

If, starting from the position shown in FIG. 1, the seat back 28 is inclined forward anticlockwise, the toothed quadrant 36, after a short pivoting angle of about 15°, is pivoted already far enough for the abutment flank 52 to no longer contact the teeth of the toothed quadrant 36. It is then pivoted clockwise by the spring 48, its retaining flank is allowed to overlap the corresponding flank of the detent part 40 and to retain it as shown in FIG. 2. The prerequisite thereof is that the blocking cam 44 is released, although this is not necessary in order for the hinge mounting to be capable of pivoting at all.

In the embodiment shown in FIG. 3, there is shown that the detent part 40 can also be disposed in a longitudinal guide with the second hinge arm 32. This embodiment is an alternative to the pivotal arm according to the first exemplary embodiment. The longitudinal guide is formed by a long hole in the direction of displacement in the detent part 40 and by two round pins located in the long hole and protruding from the second hinge arm 32.

Additionally and irrespective of the pusher configuration, the control part 46 is configured differently in the second exemplary embodiment shown in FIG. 3. It is now configured to be a rocker arm. It is carried for pivotal movement about the hinge axis 34 and substantially has an elongate arm ending in the retaining means 50, which is curved in the shape of a hook. In the intermediate region, this arm is angled so that, in the angled region, it is located in the plane of the toothed quadrant 36. There, it forms the abutment flank 52 that interacts with a side surface of the toothed quadrant 36 and abuts as shown in FIG. 3.

If, starting from the immobilized condition shown in FIG. 3, the detent part 40 is pulled free and if, maintaining this condition, the seat back is pivoted forward, meaning anti-clockwise, a catch bight of the detent part 40 enters the retaining means 50 after a short pivoting angle of about 15°; as the seat back 28 is moved further forward, the control part 46 no longer follows the movement of the toothed quadrant 36 but rather continues to abut the detent part 40, retaining said detent part in the passive position. The passive position is maintained until the back rest 28 is displaced upward far enough for the front edge 58 of the toothed quadrant 36 to hit the abutment flank 52 and pivots the control part 46 far enough for the retaining means 50 to be out of engagement with the detent part 40.

In the configuration shown in FIG. 4, there is shown a construction that is also suited for forming a circular blank. The two hinge arms are now in the shape of disks, they are assembled in a known way to form a circular blank, for example by means of an outer enclosure that has not been illustrated herein.

Like in the second exemplary embodiment, the detent part 60 is configured to be a pusher that is slidable with respect to the second hinge arm 32 in a longitudinal guide formed by four guiding blocks. The guiding blocks are connected with the second hinge arm 32. Like before, the actuation system for the detent part 40 is not shown. The actuation system is configured according to prior art.

The toothed quadrant 36 now has a toothed inner surface feature. In the condition shown in FIG. 4, the toothed quadrant is in a position in which it is not located opposite the detent part 40. Accordingly, the angular range 56 is passive.

Like in the second exemplary embodiment, the control part 46 is configured to be a rocker arm. It is again formed with one arm, said one arm being pivotal about the hinge axis 34. It is elastically biased anti-clockwise by the spring 48.

In the passive position of the detent part 40, as shown in FIG. 4, a retaining means 50, which is here configured to be a flank, of the control part 46 engages underneath a retaining region 60 that is configured herein as a pin 60 which protrudes from the detent part 40. As a result, said detent part is retained in the passive position.

If, starting from the illustration shown in FIG. 4, the first hinge arm 30 is rotated clockwise, the front edge 58 abuts the abutment flank 52 of the control part 46 after a few angular degrees of pivotal movement. As a result, said control part is pulled along with the clockwise movement against the action of the spring 48. If it is pulled along far enough for the retaining means 50 no longer to be located underneath the pin 60, the movement of the detent part 40 toward the toothed quadrant 36 is released.

The invention claimed is:

1. An adjustable hinge mountings for a motor vehicle seat comprising a) a first hinge arm, b) a second hinge arm that is pivotal and adjustable about a hinge axis relative to said first hinge arm, c) a toothed quadrant that is centered on said hinge axis and is connected to said first hinge arm, d) a detent part which has a toothed surface feature cooperating with said toothed quadrant and which can be moved from a normally existing detent position into a release position, and e) a control part that is associated with said detent part, wherein said hinge arms can be pivoted between an active angular range in which said detent part is allowed to engage said toothed quadrant and a passive angular range in which said detent part is not located opposite said toothed quadrant so that said detent part is not allowed to engage said toothed quadrant as long as said hinge arms are in said passive angular range, in the passive angular range, said detent part is retained by said control part in a passive position in which it is not in the range of movement of said toothed quadrant, in the active angular range, said control part allows said detent part to adopt an active position in which said detent part can be brought into engagement with said toothed quadrant and when passing from the passive angular range to the active angular range, said toothed quadrant collides with and actuates said control part.

2. The hinge mountings as set forth in claim 1, wherein a blocking cam is provided and is disposed on said second hinge arm and retains said detent part in engagement with said toothed quadrant.

3. The hinge mountings as set forth in claim 1, wherein said control part is movably disposed on said second hinge arm.

4. The hinge mountings as set forth in claim 3, wherein said control part is articulated for pivotal movement about an axis of said control part.

5. The hinge mountings as set forth in claim 3, wherein a guide is provided and said control part is disposed for displacement in said guide.

6. The hinge mountings as set forth in claim 1, wherein said control part is configured to be a rocker arm that is pivotal about said hinge axis.

7. The hinge mountings as set forth in claim 1, wherein a spring is associated with said control part, said spring elastically biasing said control part toward said detent part.

8. The hinge mountings as set forth in claim 1, wherein said detent part is movably disposed on said second hinge arm.

9. The hinge mountings as set forth in claim 8, wherein said detent part is hinged to said second hinge arm for pivotal movement about an axis of said detent part.

10. The hinge mountings as set forth in claim 8, wherein a longitudinal guide is provided and said detent part is disposed in said longitudinal guide for displacement with respect to said first hinge arm.

11. The hinge mountings as set forth in claim 1, wherein said control part comprises a retaining means and that said detent part comprises a retaining region associated with said retaining means.

12. The hinge mountings as set forth in claim 1, wherein said toothed quadrant directly actuates said control part, and when passing from said passive range to said active angular range, said toothed quadrant has a path of movement and clears said control part from said path.

13. The hinge mountings as set forth in claim 1, wherein said toothed quadrant indirectly actuates said control part.

* * * * *